United States Patent [19]

Campbell

[11] Patent Number: 5,360,045

[45] Date of Patent: Nov. 1, 1994

[54] WHEEL TRACTION LOG ASSEMBLY

[76] Inventor: Donald R. Campbell, 1210 W. 7th Rd., Aurora, Nebr. 68818

[21] Appl. No.: 103,424

[22] Filed: Aug. 9, 1993

[51] Int. Cl.⁵ .............................................. B60C 27/04
[52] U.S. Cl. ................................. 152/225 C; 301/44.3
[58] Field of Search ................. 152/225 C, 226, 227, 152/186; 301/44.1, 41.1, 44.3, 44.4

[56] References Cited

U.S. PATENT DOCUMENTS

| | | | |
|---|---|---|---|
| 1,290,474 | 1/1919 | Achberger | 152/226 |
| 1,770,040 | 7/1930 | McKenney et al. | 152/226 |
| 2,445,947 | 7/1948 | Hoppes | 152/225 C |
| 2,694,432 | 11/1954 | Lengyel et al. | 152/225 C |
| 2,771,115 | 11/1956 | Brown | 152/225 C |
| 2,808,094 | 10/1957 | Marchionda | 152/226 |
| 2,871,903 | 2/1959 | Minutilla | 152/226 |
| 2,953,182 | 9/1960 | Brown | 152/226 |
| 3,103,242 | 9/1963 | Culp | 152/230 |
| 3,157,217 | 11/1964 | Ledbetter | 152/225 C |
| 3,245,451 | 4/1966 | Gellman | 152/225 C |
| 4,159,731 | 7/1979 | Dyrdahl | 152/226 X |
| 4,386,643 | 6/1983 | Belknap, III et al. | 152/225 C X |
| 4,402,357 | 9/1983 | Granryd | 152/216 |
| 4,508,150 | 4/1985 | Granryd | 152/169 |

Primary Examiner—Michael W. Ball
Assistant Examiner—Francis J. Lorin
Attorney, Agent, or Firm—John R. Flanagan

[57] ABSTRACT

A wheel traction lug assembly includes a pair of side plates with wedge-shaped elements on upper ends thereof extending toward one another so as to define a wedge-shaped gap therebetween being wider at respective front ends than rear ends of the wedge-shaped elements, a cross bracket pivotally attached to and extending between midsections of the side plates, a pair of holding clips disposed on lower ends of the side plates for gripping opposite sides of a wheel rim, and a lug extension plate pivotally mounted to the cross bracket and extending upwardly between the wedge-shaped elements on the side plates such that the tighter the lug extension plate becomes wedged between the upper ends of the side plates the tighter the holding clips on the lower ends of the side plates grip opposite sides of the wheel rim as to remain at a stationary position about the wheel rim.

16 Claims, 2 Drawing Sheets

WHEEL TRACTION LOG ASSEMBLY

BACKGROUND OF THE INVENTION

1. Field of the Invention

The present invention generally relates to a device for improving wheel traction and, more particularly, is concerned with a wheel traction lug assembly used, for example, on wheels for an irrigation system.

2. Description of the Prior Art

Center pivot irrigation assemblies are widely used in many parts of the United States. In typical center pivot irrigation assemblies, multiple sections of tubing are connected end to end with one another. The innermost section of tubing is pivotally connected to a central stationary support structure and coupled in flow communication with a source of flowing water, such as a pump.

The connected sections of tubing are supported above the ground by mobile frames at heights sufficient to clear the crops growing in the field. Each of these mobile frames usually has a pair of large wheels rotatably mounted at opposite forward and rearward ends. One of the wheels of the pair is typically driven by an electric motor to cause circular movement of center pivot irrigation assembly about the central stationary support structure.

Frequently, due to accumulation of water, low places in the field become soft and spongy, causing the drive wheels to lose traction and spin and to become partially buried in the soft soil. The forward movement of the irrigation assembly is thereby impeded requiring the attention of an operator to unstick the drive wheels. One approach to dislodging the stuck parts of the irrigation assembly is to use a tractor to pull the assembly. Getting the tractor to the affected part of the irrigation assembly unfortunately causes destruction of some of the crop. Other approaches are to use jacks, logs, or rocks to attempt to raise the buried wheel or to use a spade to dig the mud away from the buried wheel. These latter approaches are time consuming and laborious and many times are futile.

Consequently, a need still exists for a device to effectively dislodge a buried wheel while avoiding the drawbacks of the above-described approaches.

SUMMARY OF THE INVENTION

The present invention provides a wheel traction lug assembly designed to satisfy the aforementioned need. The wheel traction lug assembly of the present invention is a simple and effective device for removing an irrigation assembly wheel from a buried condition in a soft water-saturated place in the field. One or more of the devices can be readily moved by the operator to the affected part or parts of the irrigation assembly without causing any damage to the neighboring portions of the crop in the field. Also, one or more of the devices can be carried on the mobile frames so that they will be close at hand if needed.

Accordingly, the present invention is directed to a wheel traction lug assembly which comprises: (a) a pair of side members with wedge-shaped elements on upper ends thereof extending toward one another so as to define a wedge-shaped gap therebetween being wider at respective front ends than rear ends of the wedge-shaped elements; (b) a cross member pivotally attached to and extending between the side members between upper and lower ends thereof; (c) means disposed on the lower ends of the side members for gripping opposite sides of a wheel rim; and (d) a lug extension member pivotally mounted to the cross member and extending upwardly between the wedge-shaped elements on the side members such that the tighter the lug extension member becomes wedged between the upper ends of the side members the tighter the gripping means on the lower ends of the side members grip opposite sides of the wheel rim so as to remain at a stationary position about the wheel rim.

More particularly, the cross member includes a middle portion, a pair of opposite side portions pivotally connected to the respective side members, and means for releasably fastening the side portions to opposite lateral ends of the middle portion so as to permit adjusting the positions of the side portions toward and away from one another relative to the middle portion to thereby change the distance between the side members. Also, the lug extension member includes a main portion pivotally connected to the cross member, a pair of tab portions, and means for releasably fastening the tab portions to opposite lateral ends of the main portion so as to permit rotation of the tab portions about off-center axes relative to the main portion and thereby change the effective width of the lug extension member. Further, the gripping means disposed on the lower ends of the side members include clip members and fasteners for releasably fastening the clip members to the lower ends of the side members so as to permit adjusting the positions of the clip members relative to the middle portion to thereby align the clip members relative to the opposite sides of the wheel rim.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 4 is a front elevational view of the wheel traction lug assembly, as seen along line 4—4 of FIG. 3, but being shown positioned on a wheel.

FIG. 5 is a vertical sectional view of the wheel traction lug assembly taken along line 5—5 of FIG. 4.

DETAILED DESCRIPTION OF THE INVENTION

Figure 1:
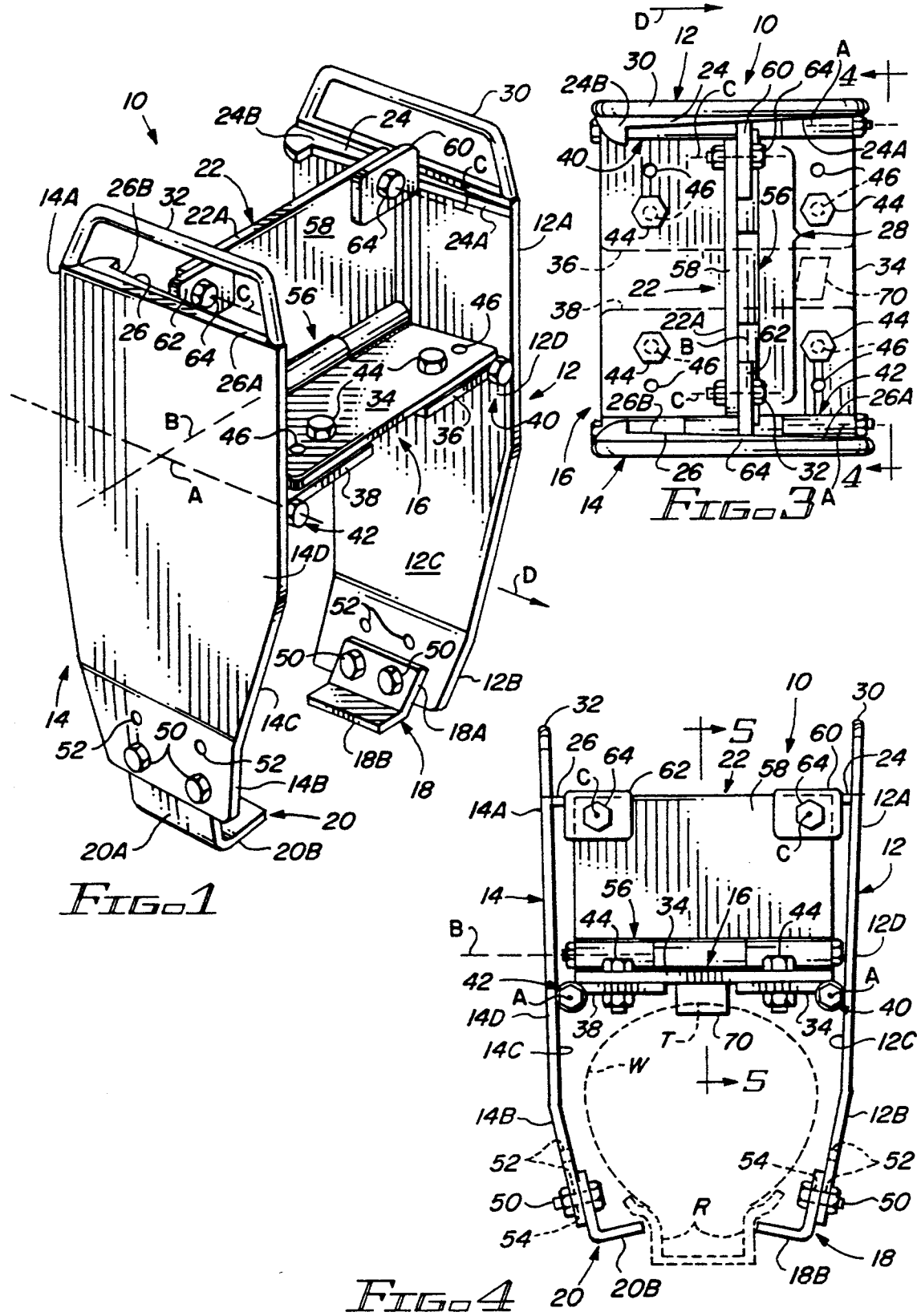
FIG. 1 is a perspective view of a wheel traction lug assembly of the present invention.
Figures 2, 3:
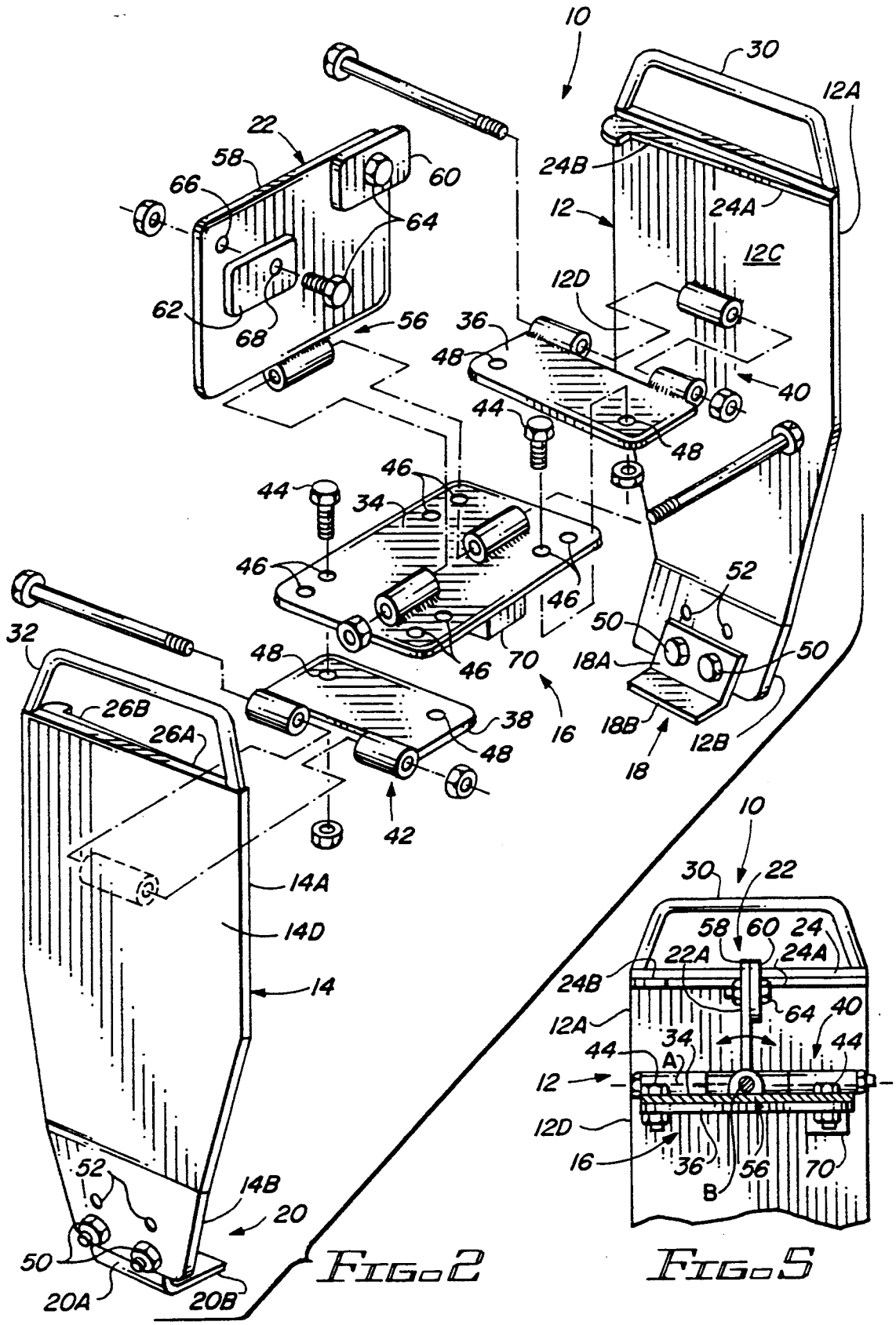
FIG. 2 is an exploded view of the wheel traction lug assembly.
FIG. 3 is a top plan view of the wheel traction lug assembly of FIG. 1.

Referring to the drawings and particularly to FIGS. 1 and 2, there is illustrated a wheel traction lug assembly, generally designated 10, of the present invention, for mounting upon the periphery of a wheel W, as shown in phantom in FIG. 4. Basically, the wheel traction lug assembly 10 includes a pair of side members 12, 14, a cross member 16, a pair of holding clips 18, 20, and a lug extension member 22.

Referring to FIGS. 1–5, each of the side members 12, 14 of the traction lug assembly 10 has a pair of opposite upper and lower ends 12A, 12B and 14A, 14B, and an elongated wedge-shaped element 24, 26 fixedly attached at the respective upper ends 12A, 14A on the inside surfaces 12C, 14C of the side members 12, 14 so as to extend toward one another. The wedge-shaped elements 24, 26 define a wedge-shaped gap 28 between them which is wider at the front ends 24A, 26A of the wedge-shaped elements 24, 26 than at rear ends 24B, 26B thereof. Each side member 12, 14 also has a handle 30, 32 attached on and extending upwardly from the upper end 12A, 14A thereof for use in manually carrying the lug assembly 10. Also, the side members 12, 14 preferably are in the form of substantially flat rigid plates although the lower ends 12B, 14B thereof are preferably bent slightly inwardly toward one another relative to the planes of the remainder of the plates. The side members 12, 14 are disposed in parallel relationship to one another and to a forward direction of movement D (see the arrow in FIGS. 1 and 3) of the wheel W (shown in FIG. 4) with which the traction lug assembly 10 is being used.

Referring still to FIGS. 1-5, the cross member 16 of the traction lug assembly 10 is adjustably and pivotally attached to and extends between midsections 12D, 14D of the side members 12, 14 at the inside facing surfaces 12C, 14C thereof. The midsections 12D, 14D of the side members 12, 14 are located approximately midway between and spaced from the upper and lower ends 12A, 14A and 12B, 14B of the respective side members 12, 14. The cross member 16 provides a mounting bracket for the lug extension member 22.

More particularly, the cross member 16 includes a substantially flat rigid middle portion 34, a pair of substantially flat opposite side portions 36, 38 being pivotally connected by hinges 40, 42 to the respective midsections 12D, 14D of the side members 12, 14. The cross member 16 also includes means in the form of a plurality of bolts 44 and a plurality of holes 46, 48 defined through the middle portion 34 and side portions 36, 38 of the cross member 16. The bolts 44 and holes 46, 48 are used to releasably fasten the side portions 36, 38 to opposite lateral ends of the middle portion 34. The holes 46 in the middle portion 34 are arranged in side-by-side pairs which permit adjusting the positions of the side portions 36, 38 toward and away from one another and relative to the middle portion 34 to thereby change the distance between the side members 36, 38 so as to adapt the lug assembly 10 to fit wheels W of different sizes. The hinges 40, 42 define respective axes A extending parallel to one another and to the forward direction of movement D of the wheel W mounting the traction lug assembly 10. The axes A also extend along the respective midsections 12D, 14D of the side members 12, 14 parallel to the planes of the midsections and to the plane of the middle portion 34 of the cross member 16.

Referring to FIGS. 1, 2 and 4, the holding clips 18, 20 of the traction lug assembly 10 have right angle configurations and are disposed at the respective lower ends 12B, 14B of the side member 12, 14 on the inside surfaces 12C, 14C thereof. The holding clips 18, 20 have upper mounting portions 18A, 20A and lower gripping portions 18B, 20B, thusly adapting the clips 18, 20 for gripping the opposite sides of a mounting rim R of the wheel W, as depicted in FIG. 4.

The positions of the holding clips 18, 20 on the lower ends 12B, 14B of the side members 12, 14 can also be adjusted to accommodate wheels W of different sizes. For this purpose, a plurality of fasteners 50 are provided and a plurality of openings 52, 54 are defined through the lower ends 12B, 14B of the side members 12, 14 and through the upper mounting portions 18A, 20A of the clips 18, 20. The fasteners 50 are thus used to releasably fasten the clip members 18, 20 to the lower ends 12B, 14B of the side members 12, 14. The holes 52 in the lower ends 12B, 14B of the side members 12, 14 are arranged in vertically-spaced pairs which permit adjusting the positions of the clip members 18, 20 relative to opposite sides of the wheel rim R so as to accommodate wheels of different sizes.

Referring to FIGS. 1-5, the extension lug member 22 of the traction lug assembly 10 is pivotally mounted by a hinge 56 to the middle portion 34 of the cross member 16 and extend upwardly therefrom through the wedge-shaped gap 28 defined between the wedge-shaped elements 24, 26 on the upper ends 12A, 14A of the side members 12, 14. The hinge 56 defines an axis B extending perpendicular to the pivotal axes A of the hinges 40, 42 which pivotally connect the cross member 16 with the side members 12, 14. More particularly, the lug extension member 22 includes a substantially flat main portion 58 being pivotally connected by the hinge 56 upon the middle portion 34 of the cross member 16 and a pair of tab portions 60, 62 releasably fastened by bolts 64 and holes 66, 68 defined in the upper opposite corners 58A of opposite lateral ends of the main portion 58 and in the tab portions 60, 62. The holes 68 through the tab portions 60, 62 are offset from the centers thereof such that the tab portions 60, 62 can be rotated about respective axes C extending perpendicular to the plane of the flat main portion 58 of the lug extension member 22 relative to the main portion 58 so as to protrude through different distances beyond the lateral ends of the main portion 58 and thereby function to change the effective width of the main portion 58 of the lug extension member 22. The effective width of the main portion 58 of the lug extension member 22 is set to equal the distance between portions of the wedge-shaped elements 24, 26 on the upper ends 12A, 14A of the side members spaced between the front and rear ends 24A, 26A and 24B, 26B of the wedge-shaped elements 24, 26 such that the outer ends of the tab portions 58 will engage such portions, as seen in FIGS. 1, 3 and 5, when the holding clips 18, 20 on the lower ends 12B, 14B are engaged with the opposite sides of the mounting rim R of the wheel W.

The traction lug assembly 10 also includes an anti-slip lug element 70 attached on a bottom side 16A of the cross member 16 and protruding downwardly therefrom toward peripheral threads T on the wheel W. The anti-slip lug element 70 interfits with the threads T so as to prevent slippage of the lug assembly 10 relative to the wheel W, especially prior to holding clips 18, 20 on the lower ends 12B, 14B of the side members 12, 14 being forced to grip the opposite sides of the wheel rim R with a degree of tightness sufficient to maintain the lug assembly 10 at a stationary position on the wheel rim R.

To install the lug assembly 10 over a peripheral portion of the wheel W, the lug extension member 22 is pivoted forwardly and downwardly flush upon the middle portion 34 of the cross member 16, allowing the lower ends 12B, 14B of the side members 12, 14 to be moved outwardly away from one another so as to provide sufficient clearance for the holding clips 18, 20 to be moved downwardly past the wheel rim R. When the lug assembly 10 is initially installed over a peripheral portion of the wheel W, the lug extension member 22 is not sufficiently tightly wedged between the upper ends of the side members 12, 14 to allow the lug assembly 10 to perform its intended function. The necessary tightness is achieved when lug extension member 22 is forced to pivot in a rearward direction relative to the side members 12, 14 between the wedge-shaped elements 24, 26. Such essential rearward pivoting of the lug extension member 22 occurs quickly in response to it encountering the ground as the lug assembly 10 is moved with the wheel W. As the lug extension member 22 is moved rearwardly, the opposite tab portions 60, 62 on the extension lug plate 22 through their contact with the wedge-shaped elements 24, 26 force the upper ends 12A, 14A of the side members 12, 14 to move away from one another and simultaneously move the lower ends 12B, 14B of the side members 12, 14 toward one another, causing the holding clips to thus tighten their grip with opposite sides of the wheel rim R and thereby more tightly secure the lug assembly 10 in the stationary position on the wheel periphery. Only when the lug assembly 10 is so retained at a stationary position relative to the wheel W can the lug assembly 10 function as intended to assist in lifting the wheel 10 upwardly out of its buried condition.

In order to remove the lug assembly 10 from the wheel, the lug extension member 22 is merely struck on its rear surface 22A in order to unwedge it from between the wedge-shaped elements 24, 26 on the side members 12, 14. Once unwedged and loosened, the lug extension member 22 can be pivoted forwardly and downwardly flush upon the middle portion 34 of the cross member 16, allowing the lower ends 12B, 14B of the side members 12, 14 to move outwardly away from one another and unclamp the holding clips 18, 20 form the wheel rim R. The loosened lug assembly 10 can then be easily lifted off from the wheel W by using the handles 30, 32.

The components of the lug assembly 10 can be easily fabricated from any suitable metal material using conventional manufacturing techniques. The lug assembly 10 can be installed and removed with ease. As explained above, the holes 48 and bolts 44 provide two adjustments to control the width of the cross member 16 and thereby the overall width of the lug assembly 10. Also, there are four adjustments on the lug extension member provided the different edges of the rectangular-shaped tab portions 60, 62 to ensure a proper fit of the clips 18, 20 on the lower ends 12B, 14B of the side members 12, 14 under the wheel rim R.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A wheel traction lug assembly, comprising:
   (a) a pair of side members being disposed in parallel relationship to a forward direction of movement of a wheel upon which said traction lug assembly is mounted during use, said side elements having wedge-shaped elements on upper ends thereof extending toward one another so as to define a wedge-shaped gap therebetween being wider at respective front ends than rear ends of the wedge-shaped elements;
   (b) a cross member pivotally attached to and extending between said side members between upper and lower ends thereof such that said side members are pivotal relative to said cross member and toward and away from one another about respective first axes extending parallel to one another and to the forward direction of movement of the wheel mounting said traction lug assembly;
   (c) means disposed on said lower ends of said side members for gripping opposite sides of a rim on the wheel; and
   (d) a lug extension member pivotally mounted to said cross member for pivotal movement about a second axis extending perpendicular to said first pivotal axes of said side members, said lug extension member extending upwardly through said wedge-shaped gap between said wedge-shaped elements on said side members and engaging said wedge-shaped elements between said respective front and rear ends thereof whereby, as said extension lug plate is forced to pivot in a rearward direction relative to said side members between said wedge-shaped elements toward said rear ends thereof in response to encountering the ground due to forward movement with the wheel mounting said lug assembly, said side members are forced to pivot away from one another at said upper ends thereof and toward one another at said lower ends thereof such that the tighter said lug extension member becomes wedged between said wedge-shaped elements on said upper ends of said side members the tighter said gripping means on said lower ends of the side members grip opposite sides of the wheel rim so as to remain at a stationary position about the wheel rim.

2. The assembly of claim 1 wherein each of said side members has a handle on said upper end thereof.

3. The assembly of claim 1 wherein said gripping means disposed on said lower ends of said side members includes clip members and fasteners for releasably fastening said clip members to said lower ends of said side members so as to permit adjusting the positions of said clip members relative to said middle portion to thereby move said clip members relative to the opposite sides of the wheel rim.

4. The assembly of claim 1 wherein said lug extension member includes a main portion pivotally connected about said second axis to said cross member, a pair of tab portions, and means for releasably fastening said tab portions to opposite lateral ends of said main portion so as to permit rotation of the tab portions relative to said main portion about third axes extending parallel to said first axes and offset from respective centers of said tab portions to thereby change the effective width of said main portion of said lug extension member.

5. The assembly of claim 1 wherein said cross member includes a middle portion, a pair of opposite side portions being pivotally connected about said respective first axes to said respective side members, and means for releasably fastening said side portions to opposite lateral ends of said middle portion so as to permit adjusting the positions of said side portions toward and away from one another relative to said middle portion to thereby change the distance between said side members.

6. The assembly of claim 5 further comprising:
   an anti-slip lug element attached on a bottom side of said middle portion of said cross member and protruding toward peripheral treads of a tire mounted on the rim of the wheel so as to interfit with the treads and thereby prevent slippage of said lug assembly relative to the wheel prior to said gripping means on said lower ends of the side members gripping the opposite sides of the wheel rim with sufficient tightness to remain at the stationary position about the wheel rim.

7. The assembly of claim 5 wherein said lug extension member includes a main portion pivotally connected about said second axis to said middle portion of said cross member, a pair of tab portions, and means for releasably fastening said tab portions to opposite lateral ends of said main portion so as to permit rotation of the tab portions relative to said main portion about third axes extending parallel to said first axes and offset from respective centers of said tab portions to thereby change the effective width of said main portion of said lug extension member.

8. The assembly of claim 7 wherein said gripping means disposed on said lower ends of said side members includes clip members and fasteners for releasably fastening said clip members to said lower ends of said side members so as to permit adjusting the positions of said clip members relative to said middle portion to thereby move said clip members relative to the opposite sides of the wheel rim.

9. The assembly of claim 1 further comprising:
an anti-slip lug element attached on a bottom side of said cross member and protruding toward peripheral treads of a tire mounted on the rim of the wheel so as to interfit with the treads and thereby prevent slippage of said lug assembly relative to the wheel prior to said gripping means on said lower ends of the side members gripping the opposite sides of the wheel rim with sufficient tightness to remain at the stationary position about the wheel rim.

10. A wheel traction lug assembly, comprising:
(a) a pair of side plates being disposed in parallel relationship to a forward direction of movement of a wheel upon which said traction lug assembly is mounted during use, each of said side plates having respective upper and lower ends and wedge-shaped elements on said upper ends extending toward one another so as to define a wedge-shaped gap therebetween being wider at front ends of said wedge-shaped elements than at rear ends thereof;
(b) a cross bracket pivotally attached to and extending between midsections of said side plates being located between and spaced from said upper and lower ends thereof such that said side plates are pivotal relative to said cross member and toward and away from one another about respective first axes extending parallel to one another and to the forward direction of movement of the wheel mounting said traction lug assembly;
(c) a pair of holding clips disposed on said respective lower ends of said side plates for gripping opposite sides of a rim of the wheel; and
(d) an extension lug member pivotally mounted to said cross bracket for pivotal movement about a second axis extending perpendicular to said first pivotal axes of said side plates, said lug extension member extending upwardly through said wedge-shaped gap between said wedge-shaped elements on said upper ends of said side plates and engaging said wedge-shaped elements between said respective front and rear ends thereof whereby, as said extension lug plate is forced to pivot in a rearward direction relative to said side plates between said wedge-shaped elements toward said rear ends thereof in response to encountering the ground due to forward movement with the wheel mounting said lug assembly, said side plates are forced to pivot about said first axes relative to said cross bracket and cause said upper ends of said side plates to move away from one another and said lower ends of said side plates to move toward one another such that the tighter said lug extension member becomes wedged between said wedge-shaped elements on said upper ends of said side plates the tighter said holding clips on said lower ends of said side plates grip opposite sides of the wheel rim and thereby retain said lug assembly in a stationary position on the wheel rim.

11. The assembly of claim 10 wherein each of said side plates has a handle on said upper end thereof.

12. The assembly of claim 10 wherein said cross bracket includes a middle portion, a pair of opposite side portions being pivotally connected about said respective first axes to said respective side plates, and means for releasably fastening said side portions to opposite lateral ends of said middle portion so as to permit adjusting the positions of said side portions toward and away from one another relative to said middle portion to thereby change the distance between said side plates.

13. The assembly of claim 12 further comprising:
an anti-slip lug element attached on a bottom side of said middle portion of said cross bracket and protruding toward peripheral treads of a tire mounted on the rim of the wheel so as to interfit with the treads and thereby prevent slippage of said lug assembly relative to the wheel prior to said clip members on said lower ends of the side plates gripping the opposite sides of the wheel rim with sufficient tightness to remain at the stationary position about the wheel rim.

14. The assembly of claim 10 wherein said lug extension member includes a main portion pivotally connected about said second axis to said cross bracket, a pair of tab portions, and means for releasably fastening said tab portions to opposite lateral ends of said main portion so as to permit rotation of the tab portions relative to said main portion about third axes extending parallel to said first axes and offset from respective centers of said tab portions to thereby change the effective width of said main portion of said lug extension member.

15. The assembly of claim 10 further comprising:
a plurality of fasteners releasably fastening said clip members to said lower ends of said side plates so as to permit adjusting the positions of said clip members relative to said middle portion to thereby move said clip members relative to the opposite sides of the wheel rim.

16. The assembly of claim 10 further comprising:
an anti-slip lug element attached on a bottom side of said cross bracket and protruding toward peripheral treads of a tire mounted on the rim of the wheel so as to interfit with the treads and thereby prevent slippage of said lug assembly relative to the wheel prior to said clip members on said lower ends of the side plates gripping the opposite sides of the wheel rim with sufficient tightness to remain at the stationary position about the wheel rim.

* * * * *